United States Patent
Heegard et al.

(10) Patent No.: US 8,396,142 B2
(45) Date of Patent: Mar. 12, 2013

(54) SYSTEM, METHOD, AND COMPUTER-READABLE MEDIUM FOR MULTILEVEL SHAPING FOR WIRELESS COMMUNICATION SYSTEMS

(75) Inventors: Chris Heegard, Sugarloaf, FL (US); Syed Nadeem Ahmed, Allen, TX (US); Brian Chadwick Joseph, McKinney, TX (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 12/113,807

(22) Filed: May 1, 2008

(65) Prior Publication Data

US 2008/0273614 A1 Nov. 6, 2008

Related U.S. Application Data

(60) Provisional application No. 60/916,158, filed on May 4, 2007.

(51) Int. Cl.
  *H04K 1/10* (2006.01)
(52) U.S. Cl. ......... 375/260; 370/208; 707/790; 714/751
(58) Field of Classification Search .................. None
  See application file for complete search history.

(56) References Cited

U.S. PATENT DOCUMENTS

| 6,507,846 B1 * | 1/2003 | Consens ................................. 1/1 |
| 2003/0043732 A1 * | 3/2003 | Walton et al. ................. 370/208 |
| 2005/0232139 A1 | 10/2005 | Balakrishnan et al. |
| 2005/0237923 A1 | 10/2005 | Balakrishnan et al. |

FOREIGN PATENT DOCUMENTS

| JP | 2005039815 A | 2/2005 |
| JP | 2008526163 A | 7/2008 |

OTHER PUBLICATIONS

International Search Report and Written Opinion of the International Searching Authority dated Jul. 14, 2008 from International Patent Cooperation Treaty Application No. PCT/US2008/62471, pp. 1-9.

* cited by examiner

*Primary Examiner* — David C. Payne
*Assistant Examiner* — Adolf Dsouza
(74) *Attorney, Agent, or Firm* — Nicholas J. Pauley; Sam Talpalatsky; Jonathan T. Velasco

(57) ABSTRACT

A system, method and computer-readable medium for encoding and decoding digital information over a channel is provided. Type Mapping is employed and is based on the partitioning of vectors over an alphabet into "types" and using enumeration for the encoding and decoding process. Type mapping allows for signal alphabets of arbitrary size and date rate flexible coding. Tradeoffs between optimal rate versus Signal to Noise Ratio are provided and works as a compliment to the Forward Error Control that may be employed in communications products.

28 Claims, 8 Drawing Sheets

SYSTEM, METHOD, AND COMPUTER-READABLE MEDIUM FOR MULTILEVEL SHAPING FOR WIRELESS COMMUNICATION SYSTEMS

PRIORITY DATA

This application claims priority to U.S. provisional patent application Ser. No. 60/916,158, entitled, "MULTILEVEL SHAPING FOR WIRELESS COMMUNICATION SYSTEMS", filed May 4, 2007, the disclosure of which is incorporated herein by reference.

BACKGROUND

Ultra-wideband (UWB) includes technology having a bandwidth larger than 500 MHz or 25 percent of a center frequency. Contemporary interest exists in development of wireless versions of serial technologies, such as universal serial bus (USB), capable of UWB transmission rates due to the proliferation of USB-adapted devices in various computational and media systems.

In digital communications, binary data is transmitted by designing a set of unique signals corresponding to individual messages. The ultimate limit of communications performance over a wireless channel is known as the channel capacity. For a given signal-to-noise ratio (SNR), channel capacity provides the highest data rate that can reliably be achieved. Conversely, for a given data rate, it provides the minimum SNR for reliable communication.

Error-correcting codes, used in conjunction with digital modulation, are widely used to provide robust communication over wireless channels. The transmitter in these wireless systems adds redundancy to the data prior to transmission. An analog carrier is then modulated with the coded signal and transmitted over the channel. The receiver demodulates the data and uses the redundancy in the data stream to decode the data in the presence of channel impairments.

Signal shaping is the process of changing the probability distribution of the transmitted signal to one that is closer to the ideal for the channel at hand. Most communication systems are typically impaired by Gaussian noise. For this type of impairment, the distribution of the transmitted signal should ideally be Gaussian.

A communication system can only achieve the capacity of the channel through a combination of error-correction coding and signal shaping. Even an optimal error-correcting code, which does not exist in practice, can get no closer than 1.53 dB from capacity, without signal shaping. Practical coding techniques, including bit-interleaved coded modulation, trellis-coded modulation, multi-level codes, Low Density Parity check (LDPC) codes, and turbo codes are bounded even further away from capacity.

BRIEF DESCRIPTION OF THE DRAWINGS

Aspects of the present disclosure are best understood from the following detailed description when read with the accompanying figures, in which.

DETAILED DESCRIPTION

Figure 1:
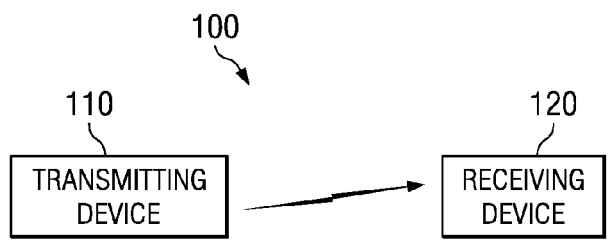
FIG. 1 is a diagrammatic representation of an exemplary system in which binary data may be transmitted from a transmitting device in the form of a group of bits to a receiving device in accordance with an embodiment.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an exemplary system 100 in which binary data may be transmitted from a transmitting device 110, such as a computer, a radio tuner, and/or a DVD player communicating data, in the form of a group of bits, to a receiving device 120, such as a printer, a speaker, and/or a television, in accordance with an embodiment. The data can provide information such as a data file, an audio signal, and/or a multimedia signal. The data is provided over a wireless channel, such as an Ultra Wideband (UWB) channel and/or Wireless Local Area Network (WLAN) channel. In some embodiments, the wireless channel may be similar to one commonly referred to as wireless USB, as defined by the WiMedia Alliance. WiMedia refers, in general, to a method for providing wireless multimedia connectivity and interoperability between devices in a personal area network. See www.wimedia.org, the contents of which are hereby incorporated by reference. The present description and embodiments, however, are not limited to UWB, WLAN, or wireless USB technology, but have general applicability, as would be appreciated by one of ordinary skill in the art.

Figure 2:
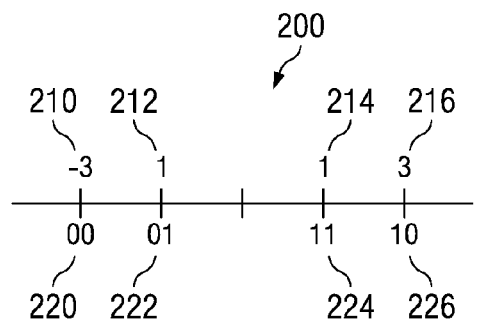
FIG. 2 is a diagrammatic representation of an exemplary constellation labeling which illustrates the conversion of digital bits to analog signals.

To transmit a group of m bits, $M=2^m$ unique signals are selected to create a one-to-one mapping between each m-bit data pattern and a signal. FIG. 2 is a diagrammatic representation of an exemplary constellation 200 labeling which illustrates the conversion of digital bits to analog signals. This signal constellation has M=4 points 210-216 each receptively able to convey m=2 bit messages 220-226 of information.

A common way to design a signal set of size M is to choose a base signal and then scale the base signal by an odd integer, i.e., $\pm 1, \pm 3, \ldots, \pm(M-1)$. This is known as the M-ary (or Multilevel) Pulse Amplitude Modulation (M-PAM) signal constellation. M-PAM represents an n=1 dimensional signal set. The data rate of M-PAM is m=$\log_2(M)$ bits per dimension. The average signal power is $(M^2-1)/3$ per dimension, and the peak power is $(M-1)^2$. Thus, constellation 200 has a peak power of 9 corresponding to both messages 220 and 226. It should be noted that to increase the data rate by one bit can require that the maximum amplitude (M−1) roughly doubles and the average and peak power approximately quadruples. That is, the power follows a "6 dB" per bit rule.

For purposes of example, the present disclosure will consider the following n=1 dimensional signal constellations:

2-PAM: {−1, +1},
4-PAM: {−3, −1, +1, +3},
6-PAM: {−5, −3, −1, +1, +3, +5} and
8-PAM: {−7, −5, −3, −1, +1, +3, +5, +7}

It should be noted that 2-PAM, 4-PAM and 8-PAM can transmit at a message bit rate per signal of 1, 2 and 3, respectively, with power 1, 5 and 21. There is no direct way to map binary information onto 6-PAM, since $\log^2(6)$=2.585, which is not an integer. This is one of the possible deficiencies addressed by mapping mechanisms disclosed herein.

Another limitation of direct M-PAM signal sets is the fact that it uses more average power than may be required to transmit at a given rate. The reason for this is related to the fact that with random data, direct M-PAM uses all of the M levels with equal probability. A more average-power-efficient encoding of the data would skew the probabilities to favor the low amplitude signals over the large amplitude ones. When an encoder skews the probabilities to save on average power, the code is said to achieve "shaping."

Signal designs in n=2 dimensions are well known in the art and are often referred to as Quadrature-Pulse Amplitude Modulation (QAM). QAM is useful for bandpass signals that have a natural 2-dimensional description related to the orthogonality of sine and cosine waves.

Figure 3:
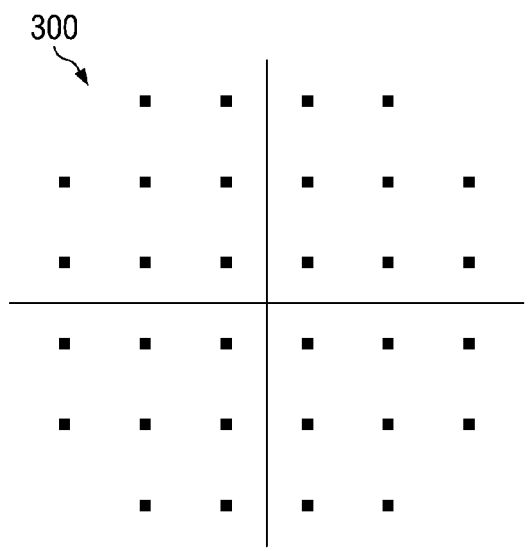
FIG. 3 is a diagrammatic representation of an exemplary 32-QAM constellation.

When the number of bits m=$\log_2(M)$ is an even integer, the M-QAM constellation is created using a pair of L-PAM signals where M=$L^2$. In this case, the bit rate and power (per dimension) for QAM is identical to PAM. When the number of bits is an odd integer, the M-QAM constellation is more interesting then simple PAM. The usual method for designing M-QAM constellations for an odd number of bits is to find the smallest value of L that makes $L^2 > M$ and to "remove" points near the corners, for example when m=5, M=32, and L=6. Therefore, 32-QAM is defined as the subset of all pairs of 6-PAM amplitudes with the 4 corner pairs, {(±6, ±6)}, removed (36−4=32) as depicted by the diagrammatic representation of a 32-QAM constellation diagram 300 of FIG. 3.

The design of mappings for signal constellations in high dimensions is a desirable yet challenging concept. The benefits include, for example, the incorporation of non-power-of-two base constellations such as 6-PAM, the ability to vary the transmission rate with a fine rate resolution, e.g., a variable rate coder with small incremental rate, and providing an efficient trade-off between data rate and transmission power.

Conceptually, for a fixed choice of PAM size M, and a given rate R≦$\log_2(M)$, an optimal block coding scheme works as follows. For each element of the M-PAM, the weight, or cost, is defined as the magnitude squared. For 6-PAM, the weight is:

$$\text{Signal }(M)\text{ Weight}\begin{pmatrix} -5 & -3 & -1 & +1 & +3 & +5 \\ 25 & 9 & 1 & 1 & 9 & 25 \end{pmatrix}$$

For a vector of blocklength n, the weight of the vector is defined as the sum of the weights of the components. For example, with a blocklength n=4, the vector X=(−3, +1, +5, −1) has weight 36=9+1+25+1. Next a codeword set is constructed with blocklength n by selecting $2^{n \cdot R}$ vectors of minimum weight. This minimizes the average power. Type mapping may be used to generate such a codeword set in a computationally efficient way. As the blocklength grows, the average energy converges to the minimum possible.

The limiting trade-off between rate, R, and minimum average power, $P_{min}$, for a fixed alphabet M-PAM is characterized by the following parametric description. For each value of the parameter $\lambda>0$, the rate and minimum average power are given by the equations:

$$R = P_{min} \cdot \log_2(\lambda) + \log_2(c), \quad P_{min} = \frac{1}{c}\sum_{v \in \mathbb{V}} |v|^2 \lambda^{-|v|^2}$$

Where the constant:

$$c = \sum_{v \in \mathbb{V}} \lambda^{-|v|^2}$$

and the set $\mathbb{V}$ is the M-PAM constellation. The limiting probability for each letter $v \in \mathbb{V}$ is given by:

$$Pr(v) = \frac{1}{c}\lambda^{-|v|^2}$$

The difficulty in designing such mappings in even higher dimensions is realized by the exponential growth in the signal set. If a rate of R bits per dimension is desired, then the number of signals that may be required in n dimensions is $2^{n \cdot R}$. For small dimension n (e.g., n=2(QAM)), the mapping can be implemented with a lookup table. However, for large dimension n, the size of such a table becomes impractical. Thus, while a rate of R=2.5 bits per dimension in dimension n=2 may require 32 QAM signals, for n=16 dimensions the number of signals is 1,099,511,627,776=$2^{40} \approx 10^{12}$.

In accordance with embodiments disclosed herein, mechanisms are provided for computationally efficient optimal signal shaping over a given alphabet size and block length as opposed to current heuristic methods, such as trellis shaping, which only provide a high probability of choosing the optimum shaping codewords. In other words, embodiments described herein do not just an approximate selection of the best codewords for shaping, but rather mechanism described herein provide for guaranteed optimal shaping codeword selection.

Consider an alphabet (or set) A={$a_1, a_2, \ldots a_L$} with L=|A| elements. The set of vectors $A^n$ of blocklength n have $L^n$=|A|$^n$=|$A^n$| elements. The vectors of length n can be classified, or partitioned, into subsets according to "type."

The type of a vector $X \in A^n$ is described by a count vector of the form:

$$\text{Count}(X)=(n_1, n_2, \ldots, n_L)$$

where $n_1$ counts the number of times the first letter in the alphabet A ($a_1$) occurs, $n_2$ counts the number of times the second letter ($a_2$) occurs, etc. Each count $0 \leq n_i \leq n$ and $n_1+n_2+\ldots+n_L=n$.

A given count vector $(n_1, n_2, \ldots, n_L)$ defines the subset of $A_L$ of that type:

$$\mathcal{T}(n_1, n_2, \ldots, n_L) \equiv \{X \in A^n | \text{Count}(X) = (n_1, n_2, \ldots, n_L)\}$$

The number of vectors of a given type is given by the multinomial formula:

$$|\mathcal{T}(n_1, n_2, \ldots, n_L)| = \text{Mult}(n_1, n_2, \ldots, n_L) = \frac{n!}{n_1! n_2! \ldots n_L!}$$

where the n-factorial $n! = n \cdot (-1)!$, $0! = 1$.

The number of types for a given alphabet size L and block-length n is expressed by the binomial formula:

$$\text{The number of types} = \text{Mult}(L-1, n) = \frac{(L-1+n)!}{(L-1)! n!}$$

As an example, consider the set $A=\{+1, +3, +5\}$ with 3 elements and a blocklength $n=4$ (Note: this set represents the "magnitudes" of the 6-PAM signal constellation). There are $81=3^4$ vectors of length 4. There are $15=\text{Mult}(2, 4)=720/(2 \cdot 48)$ types. The possible count vectors, and the number of elements, are given by the rows:

| +1 | +3 | +5 | # |
|---|---|---|---|
| 4 | 0 | 0 | 1 |
| 3 | 1 | 0 | 4 |
| 2 | 2 | 0 | 6 |
| 1 | 3 | 0 | 4 |
| 0 | 4 | 0 | 1 |
| 3 | 0 | 1 | 4 |
| 2 | 1 | 1 | 12 |
| 1 | 2 | 1 | 12 |
| 0 | 3 | 1 | 4 |
| 2 | 0 | 2 | 6 |
| 1 | 1 | 2 | 12 |
| 0 | 2 | 2 | 6 |
| 1 | 0 | 3 | 4 |
| 0 | 1 | 3 | 4 |
| 0 | 0 | 4 | 1 |

For example, consider the following types (4, 0, 0), (3, 1, 0), and (2, 2, 0) with the available vectors of each type:

$$\mathcal{T}(4, 0, 0) = \{(+1, +1, +1, +1)\}, \quad (1.1)$$

$$\mathcal{T}(3, 1, 0) = \{(+1, +1, +1, +3), (+1, +1, +3, +1),$$
$$(+1, +3, +1, +1)(+3, +1, +1, +1)\},$$

$$\mathcal{T}(2, 2, 0) = \{(+1, +1, +3, +3), (+1, +3, +1, +3),$$
$$(+1, +3, +3, +1), (+3, +1, +1, +3),$$
$$(+3, +1, +3, +1), (+3, +3, +1, +1)\},$$

One useful property of types relates to alphabets with a weight function applied to the symbols. Let $\text{Wt}(s)$ denote the weight of the symbol $s \in A$, then $(w_1, w_2, \ldots, w_L) = (\text{Wt}(a_1), \text{Wt}(a_2), \ldots, \text{Wt}(a_L))$ are the L weights on the symbols of A. An alphabet with a weight function induces a variety of weight functions on vectors.

For example, the average weight on a vector:

$$Wt_{ave}(X) = \frac{1}{n}(Wt(x_1) + Wt(x_2) + \ldots + Wt(x_n)) \quad (1.2)$$

or the maximum weight:

$$Wt_{max}(X) = \max\{x_i | 1 \leq i \leq n\} \quad (1.3)$$

Weight functions like these are constant within the same type. In fact, the weight is a function of the count vector:

$$Wt_{ave}(X) = \frac{1}{n}(n_1 \cdot w_1 + n_2 \cdot w_2 + \ldots + n_L \cdot w_L)$$

or the maximum weight:

$$Wt_{max}(X) = \max\{w_i | i : n_i > 0\}$$

where $\text{Count}(X) = (n_1, n_2, \ldots, n_L)$.

One ingredient of type mapping is a mapping from an integer onto a vector of a given type. Consider a type-set $T(n_1, n_2, \ldots, n_L)$ for a given set A and blocklength n. There are $P = \text{Mult}(n_1, n_2, \ldots, n_L)$ vectors in this set. An enumeration of this set would be a mapping from the integers between 0 and P−1 and the vectors in the set $T(n_1, n_2, \ldots, n_L)$.

Since the integers $0, 1, 2, \ldots, P-1$ are ordered, there are many ways to implement an enumeration based on the idea of "ordering" a set of vectors. Once an order is defined on the vectors, there is a natural correspondence with the integers. One example of such an enumeration is based on a "lexicographic" ordering of the vectors.

To define a lexicographic order, the symbols of the alphabet A are ordered (e.g., $a_1 < a_2 < \ldots < a_L$), and the positions of the vectors $X = (x_{n-1}, x_{n-2}, \ldots, x_0)$ are ordered from Most Significant Symbol (MSS) to Least Significant Symbol (LSS), e.g., left to right. This puts an order on all of the vectors in $A^n$.

To compare two vectors X and Y, the first MSS $x_{n-1}$ and $y_{n-1}$ are compared:
If $x_{n-1} < y_{n-1}$, then X<Y;
If $x_{n-1} > y_{n-1}$, then X>Y;
Otherwise $x_{n-1} = y_{n-1}$,
and the process proceeds to the second symbols $x_{n-2}$ and $y_{n-2}$ for comparison. This procedure is repeated until resolving X<Y, X>Y, or the LSS is compared and $x_0 = y_0$ is observed, in which case X=Y.

An ordering on all the vectors of the set $A^n$ induces an ordering on the vectors of every subset including the type-sets. As an example, the vectors in the exemplary sets of types (4, 0, 0), (3, 1, 0), and (2, 2, 0) listed above are in lexicographic order.

Consider an integer m, $0 \leq m < P$, and the problem of determining the value of the $m^{th}$ vector $X \in T(n_1, n_2, \ldots, n_L)$ under lexicographic order. Define:

$$X_n \equiv (x_{n-1}, x_{n-2}, x_{n-3}, \ldots, x_0)(= X)$$

$$X_{n-1} \equiv (x_{n-2}, x_{n-3}, \ldots, x_0)$$

$$\vdots$$

$$X_1 \equiv (x_0).$$

The MSS $x_{n-1}$ is determined first. If $x_{n-1} = a_1$, then $X_{n-1} \in T(n_1-1, n_2, \ldots, n_L)$ and $0 \leq m < \text{Mult}(n_1-1, n_2, \ldots, n_L)$.

Therefore, by testing whether $m<\text{Mult}(n_1-1, n_2, \ldots, n_L)$ or not, it can be concluded that $x_{n-1}=a_1$ or $X_{n-1}>a_1$. In the former case, $x_{n-1}$ is established and the procedure continues with the vector $X_{n-1} \in T(n_1-1, n_2, \ldots, n_L)$.

In the latter case, the procedure updates $m \rightarrow m-\text{Mult}(n_1-1, n_2, \ldots, n_L)$ and considers whether $0 \leq m < \text{Mult}(n1, n2-1, \ldots, nL)$ or not. If true, then $x_{n-1}=a_2$, and the process continues with $X_{n-1} \in T(n_1, n_2-1, \ldots, n_L)$. Otherwise $x_{n-1}>a_2$. and the process updates $m \rightarrow m-\text{Mult}(n_1, n_2-1, \ldots, n_L)$ and considers whether $X_{n-1}=a_3$.

This recursive procedure will eventually determine the MSS $x_{n-1}$ and then the second symbol $x_{n-2}$ and so forth until the LSS $x_0$ is known. This is due to identities such as:

$$P = \text{Mult}(n_1, n_2, \ldots, n_L)$$
$$= \text{Mult}(n_1 - 1, n_2, \ldots, n_L) +$$
$$\text{Mult}(n_1, n_2 - 1, \ldots, n_L)$$
$$\vdots$$
$$+ \text{Mult}(n_1, n_2, \ldots, n_L - 1)$$

where for consistency, if one or more of the arguments to the Mult( ) function is negative, then the value is 0.

In view of the above, consider an alphabet A and a block-length n. A type mapper comprises an encoding function that maps binary information of a length $k_{max}$ bits ($k_{max} \leq n \cdot \log_2(|A|)$) onto vectors in $A_n$. The mapper also has a complimentary decoding function that acts as an inverse function to the encoder that maps vectors in $A_n$ into $k_{max}$ bits. For every bit pattern $B = (b_{kmax-1}, b_{kmax-2}, \ldots, b_1, b_0)$:

$$TM_{dec}(TM_{enc}(B)) = B$$

A correspondence between k-bit blocks and integers i between 0 and $2^k-1$ using the base-2 expansion may be expressed as follows:

$$i = b_0 + b_1 \cdot 2 + b_2 \cdot 4 + \ldots b_{k-1} \cdot 2^{k-1}$$

Therefore, the type mapper is also a map for every value of k, $0 \leq k \leq k_{max}$ of the integers i, $0 \leq i \leq 2^k$ onto vectors in $A_n$.

Conceptually, in terms of binary blocks, a block of length k is padded with ($k_{max}-k$) 0's ($b_{kmax-1}=b_{kmax-2}=b_k=0$) before the encoding function $TM_{enc}(i) \equiv TM_{enc}(B)$ is applied.

A type mapping encoder has a type-ordering property that, for the given encoder, orders the types of $A_n$ in a particular way:

$$\mathcal{T}_1 < \mathcal{T}_2 < \ldots < \mathcal{T}_M. \qquad (2.1)$$

where $M \leq \text{Mult}(|A|-1, n)$.

The encoder has the property that if two integers $i < j$ have $TM_{enc}(i) \in T1$ and $TM_{enc}(j) \in T_m$, then either $T_1 = T_m$ (i.e., $1=m$) or $T_1 < T_m$ (i.e., $1 < m$).

The ordering of the types makes the computation of the encoding and decoding functions practical, as well as providing optimizing properties such as shaping, rate versus energy trade-offs, etc.

Figure 4:
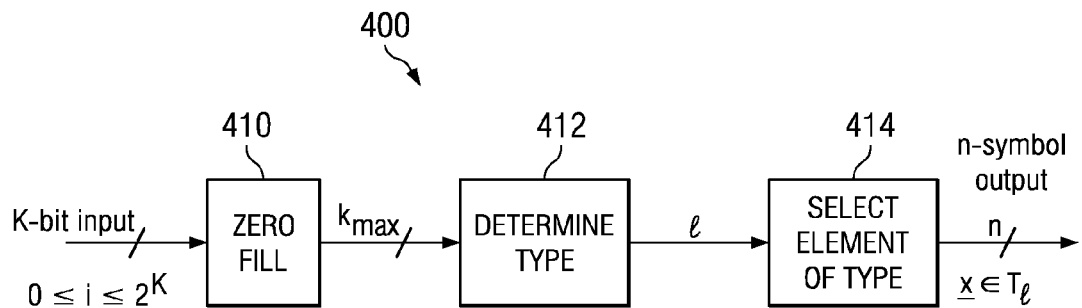
FIG. 4 is a diagrammatic representation of a process flow of a type mapping encoding function implemented in accordance with an embodiment.

FIG. 4 depicts a diagrammatic representation of a process flow of a type mapping encoding function 400 implemented in accordance with an embodiment. Encoding function 400 may be performed in a two step process, e.g., as represented by type determination process 412 and element selection of type process 414. A k-bit input may be submitted to a zero fill process 410, and a determination of the type of the encoded vector may then be performed by type determination process 412. A particular member for the determined type may then be selected by element selection of type process 414 which involves an enumeration of the type. For example, enumeration based on lexicographic order may be applied in accordance with an embodiment.

The determination of type may be described in terms of the cumulative distribution for the type-ordering.

Based on the order (Equation 2.1), define:

$$S_0 = 0,$$
$$S_1 = S_0 + |\mathcal{T}_1|,$$
$$S_2 = S_1 + |\mathcal{T}_2|,$$
$$\vdots$$
$$S_M = S_{M-1} + |\mathcal{T}_M| \leq |\mathcal{A}|^n$$

Note $0 = S_0 < S_1 < \ldots < SM \leq |A|^n$ and that $2^{kmax} \leq S_M + 1$.

To determine the type for a given input i, the solution to the inequality $$S_{l-1} \leq i < S_l$$

is solved for the index 1. The solution implies that $TM_{enc}(i) \in T_1$. Once this has been found, the residual integer $j = i - S_{i-1}$ is to be mapped onto the particular type (note $0 \leq j < |T_1|$).

One method of determining the index l for a given input i is a sequential test for $l=1, 2$, etc. A more efficient method may be implemented by applying a search algorithm, such as a binary search.

The two step encoding process may be implemented in a pipelined architecture if high speed operation is desired. In the basic case, two computing units may be operated at the same time. For example, while the first unit is determining the type for the current value of the encoder input, the enumerator determines the vector of the previous encoder input that had its type determined during the last epoch.

Further pipelining is possible if desired by pipelining the individual steps since both steps are well suited to pipelining. For example, sequential and binary search for type determination and enumeration of type are naturally processed in steps that can be pipelined.

The decoding function is similar to the two-step process of the encoder. Type determination at the decoder input may be performed by computing the counting function ($n_1, n_2, \ldots, n_L$). Once $T_j$ (and the corresponding value $S_{j-1}$) are determined, the inverse of the type enumerator, j, is found and combined to produce $i = j + S_{j-1}$. The decoder may also be pipelined in a manner analogous to the pipelining of the encoder function.

The design of a type mapper involves the selection of the basic parameters, the symbol set A, the blocklength n and the maximum binary input length $k_{max}$. Once the desired types are selected and sorted (as in Equation 2.1), a method of type selection (e.g., binary search) and type enumeration (e.g., lexicographic enumeration) are specified. The rate resolution is given the fraction 1/n while the maximum rate is determined by $k_{max}/n$. Less basic properties, such as shaping and energy versus rate, are determined by the ordering of the types.

For example, to maximize shaping gain, the types are ordered to minimize the average energy in accordance with an embodiment. In fact, the conceptual shaping method described above can be implemented via type mapping. Furthermore, types that are sorted to minimize the vector weight are uniformly optimal for every value of rate k/n with $0 \leq k \leq k_{max}$. Thus, one need not design a unique encoder/ decoder pair for each value of binary input length k. One type-mapping pair is optimal for every k for the given blocklength n.

Given an alphabet A with a weight function $Wt(a) \geq 0$, $a \in A$, the types can be ordered by the average weight or the maximum weight or mixtures. For example, for small $\epsilon > 0$, the weight function $$Wt_\epsilon(X) = Wt_{ave}(X) + \epsilon \cdot Wt_{max}(X)$$

will maximize the shaping gain, but will break "ties" based on maximum weight in accordance with an embodiment. This will often result in a unique ordering of the types.

Figure 5:
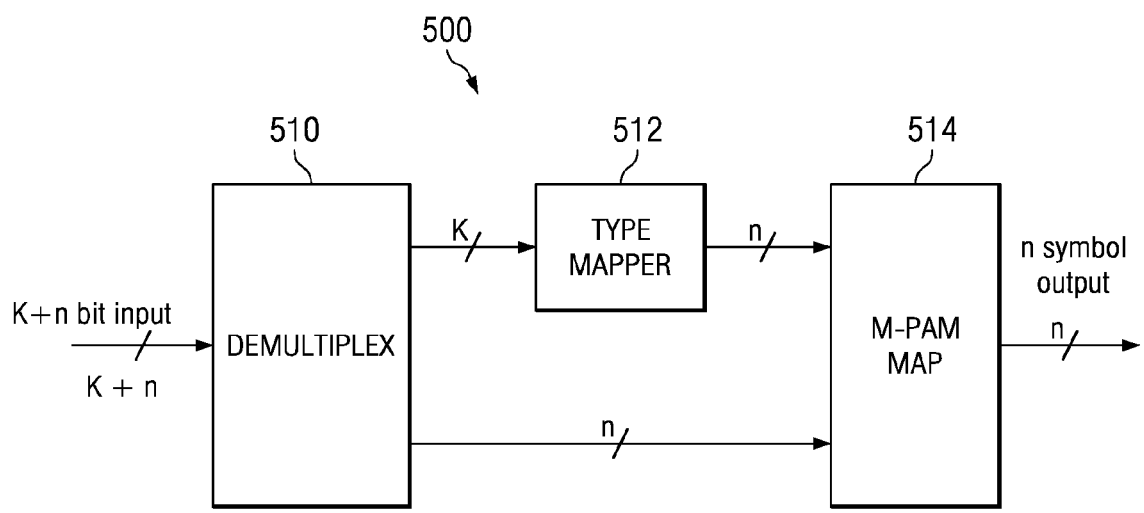
FIG. 5 is a diagrammatic representation of a modulator that maps bits onto a block of M-PAM signals in accordance with an embodiment.
Figure 6A:
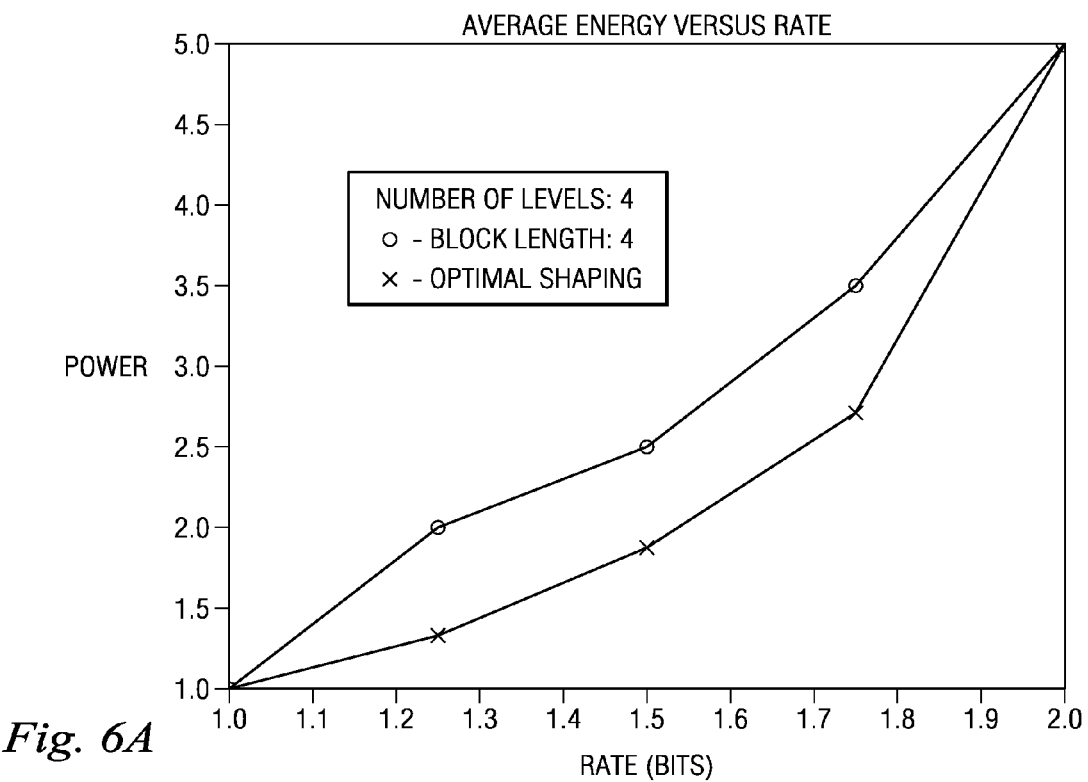
FIGS. 6A-6D are exemplary plots of the average energy versus rate for 4-PAM with blocklengths n=4, 8, 16, and 32, respectively.
Figure 6B:
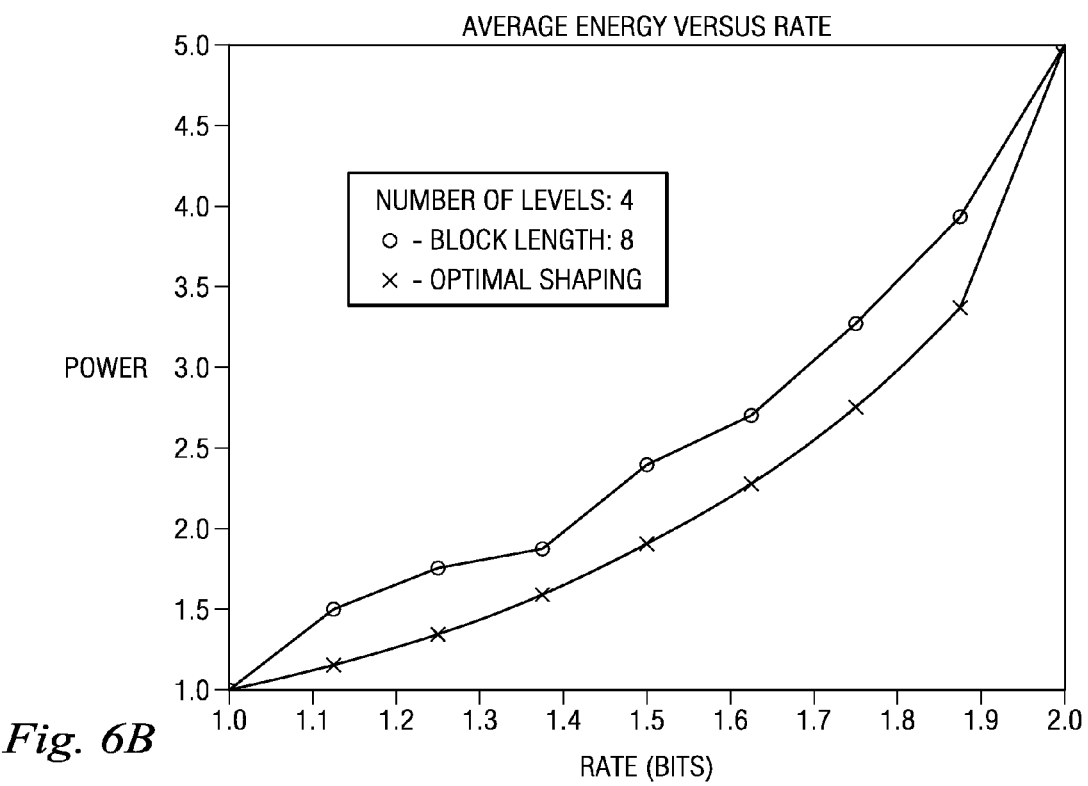
Figure 6C:
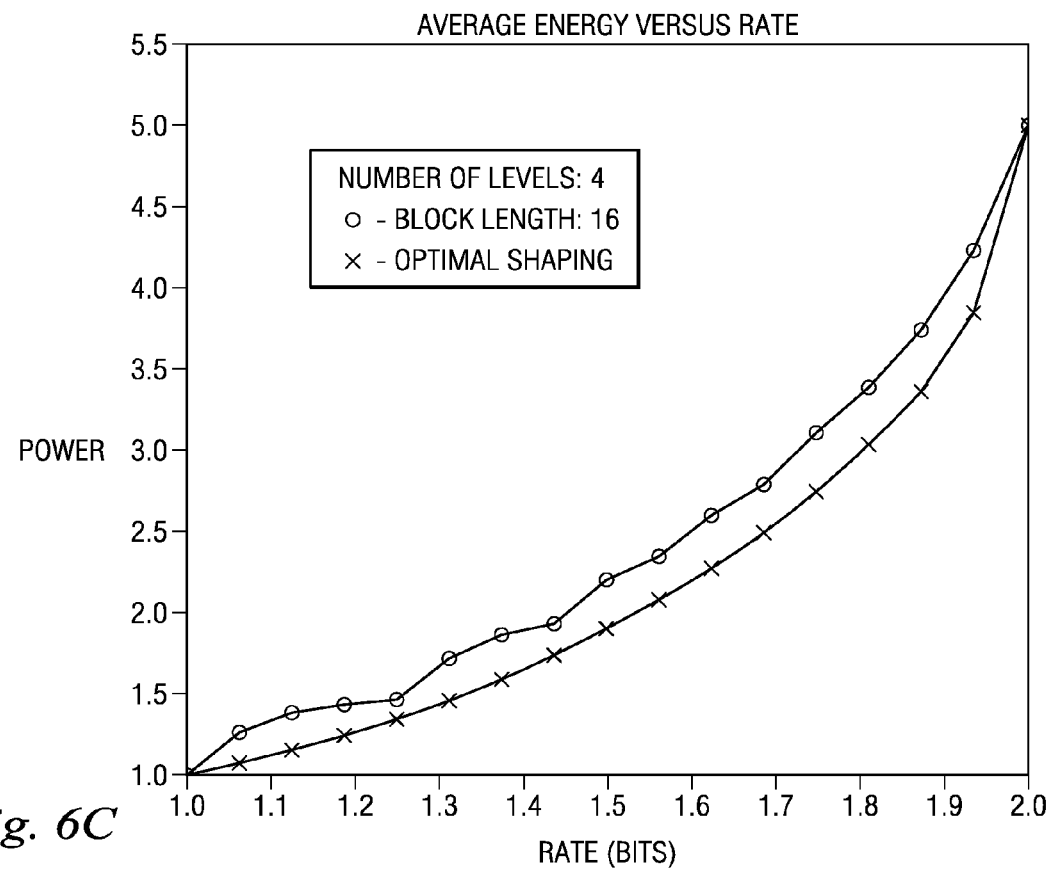
Figure 6D:
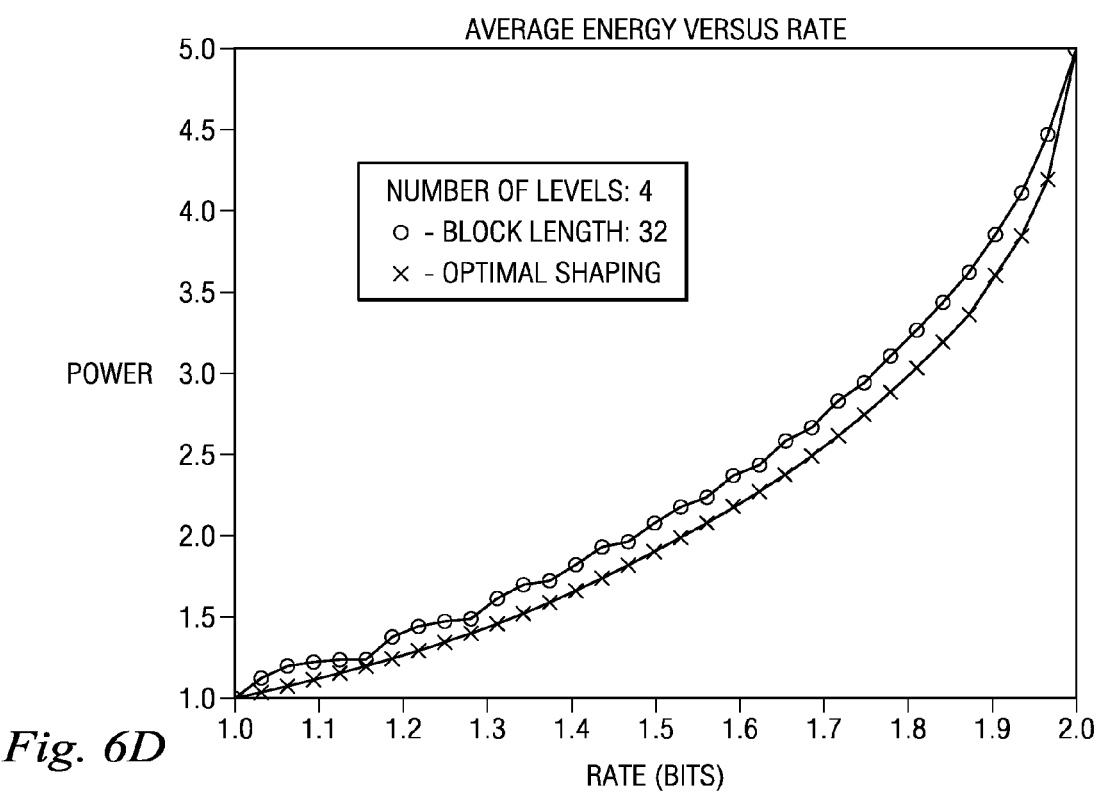
Figure 7A:
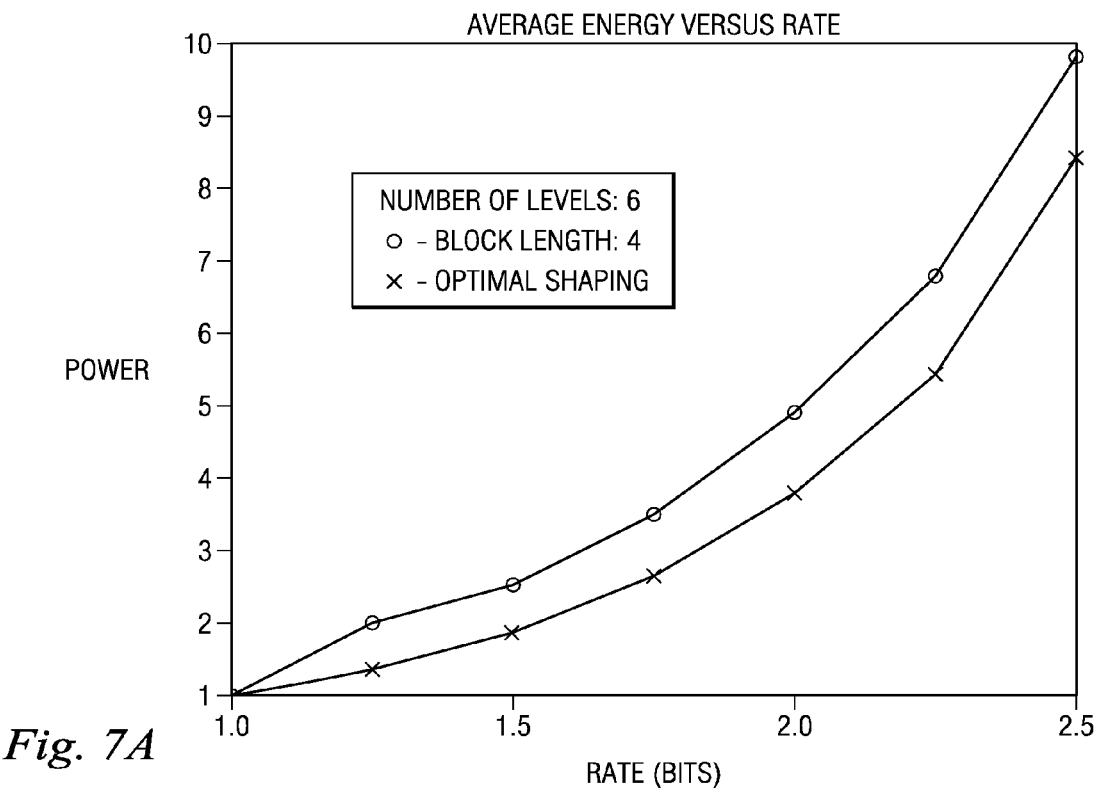
FIGS. 7A-7D are exemplary plots of the average energy versus rate for 6-PAM with blocklengths n=4, 8, 16, and 32, respectively.
Figure 7B:
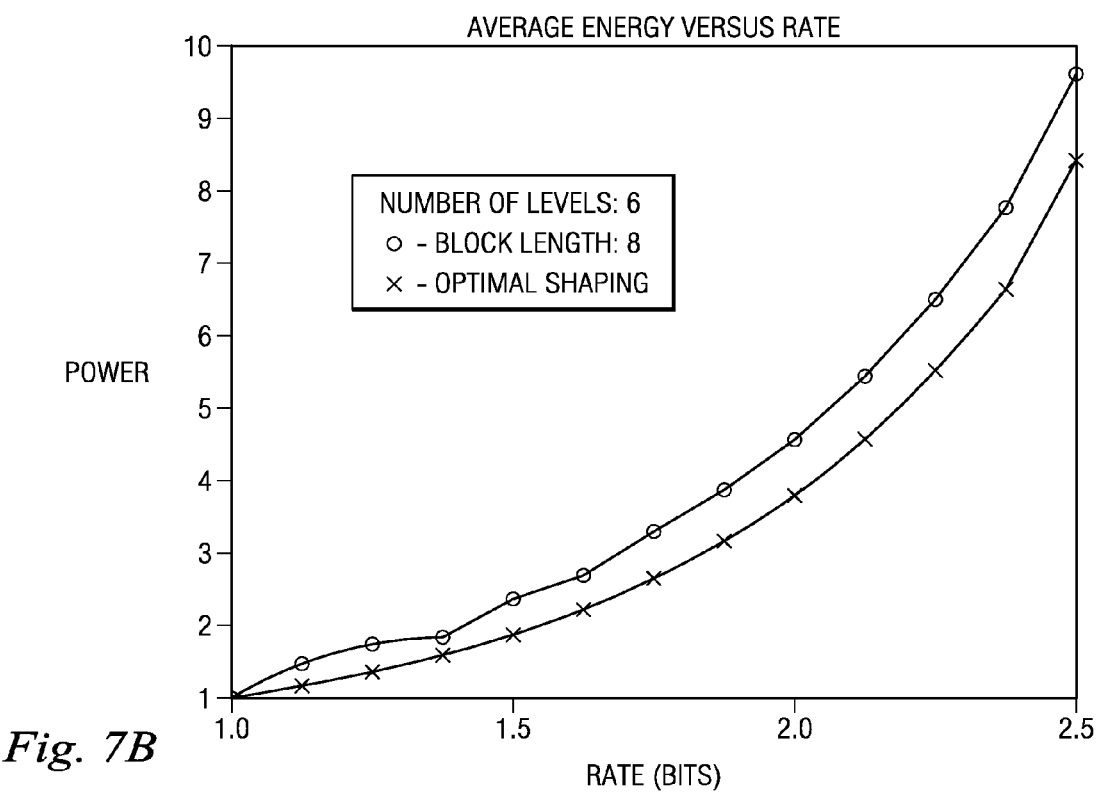
Figure 7C:
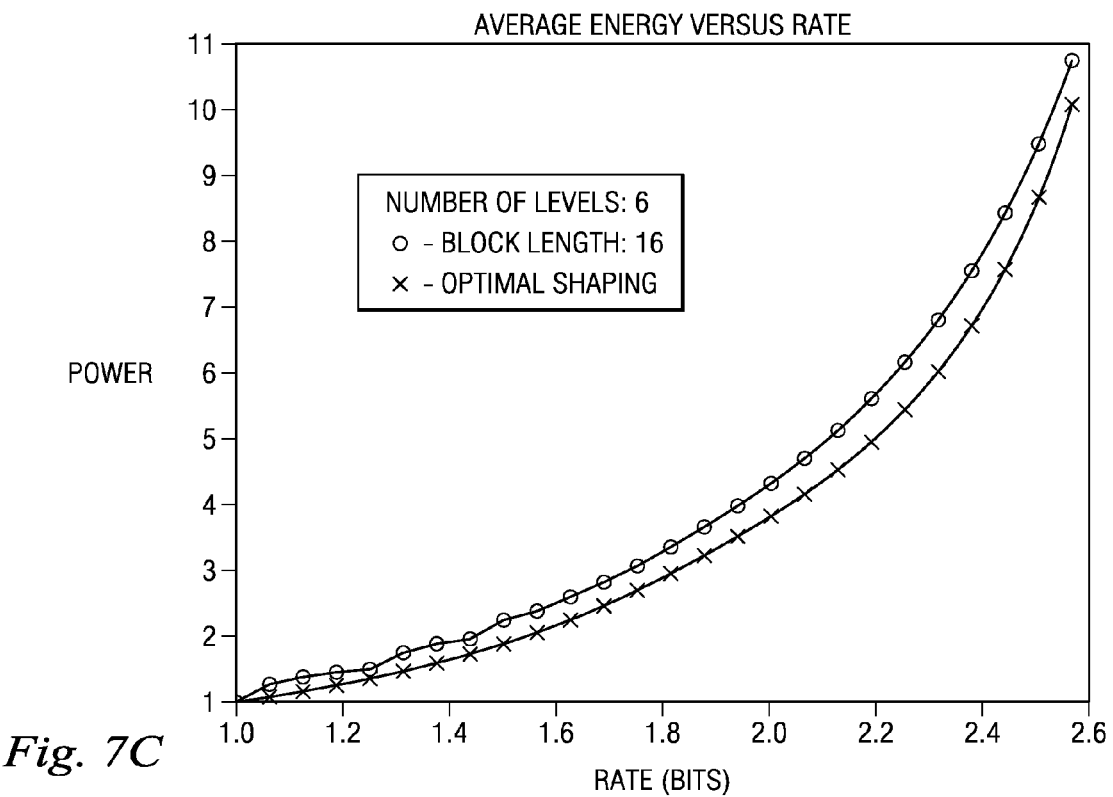
Figure 7D:
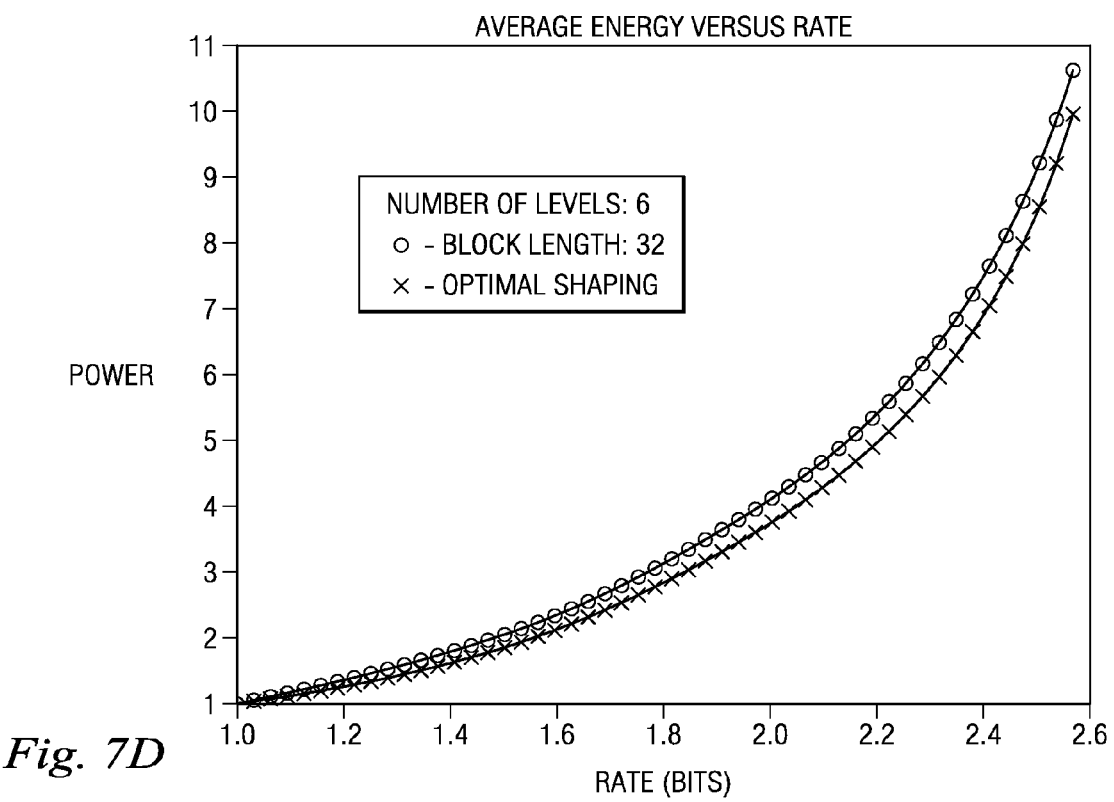

As an example, consider a type mapper optimized for average power. FIG. 5 is a diagrammatic representation of a modulator 500 that maps bits onto a block of M-PAM signals in accordance with an embodiment. As an example of type mapping optimized for average power, consider modulation with M-PAM, with M even. Modulator 500 maps k+n bits supplied to a demultiplex module 510 onto a block of n M-PAM signals output by M-PAM constellation map 514, wherein the number of bits processed by the type mapper $0 \leq k \leq n \cdot \log_2(M/2)$. The rate of the encoding is k/n+1 bits per symbol.

The alphabet for a type mapper 512 is the M/2 magnitudes of the M-PAM signal constellation +1, +3, ..., +(M−1). The weight function is the magnitude squared. To encode n+k bits, the k are typed mapped to produce n magnitudes and the remaining n message bits are used to select the sign ± of the M-PAM signals, resulting in the M-PAM constellation map 514.

FIGS. 6A-6D are exemplary plots of the average energy versus rate for 4-PAM with blocklengths n=4, 8, 16, and 32, respectively. The results can be compared with the lower curve that shows the asymptotic (i.e., large n) performance. Notably, type mapping performs quite well for relatively modest blocklengths. Furthermore, it can be seen how the rate resolution is refined with larger blocklength.

FIGS. 7A-7D are exemplary plots of the average energy versus rate for 6-PAM with blocklengths n=4, 8, 16, and 32, respectively. In this case, since 6 is not a power-of-2, the maximum rate slightly improves for longer blocklength due to the reduced influence of rounding effects on $\log_2(3)$. As can be seen, type mapping provides an efficient method of transmitting binary data over a channel with a non-power-of-2 signal constellation.

Type Mapping is complimentary to Forward Error Control (FEC), a method of signal encoding based on Error Control Coding (ECC). There are many ways in which a type mapper can be used in a communications system.

One common implementation of FEC is known as trellis coding. In classical Ungerboeck type trellis coding, a signal constellation is partitioned into subsets, or cosets, of equal size. An ECC encoder is used to encode some of the message data, producing a sequence of coset selections. Other message data is used to pick elements within the cosets determined by the ECC encoder. This other data is sometimes termed the uncoded information since they are not encoded by the ECC encoder.

Figure 8:
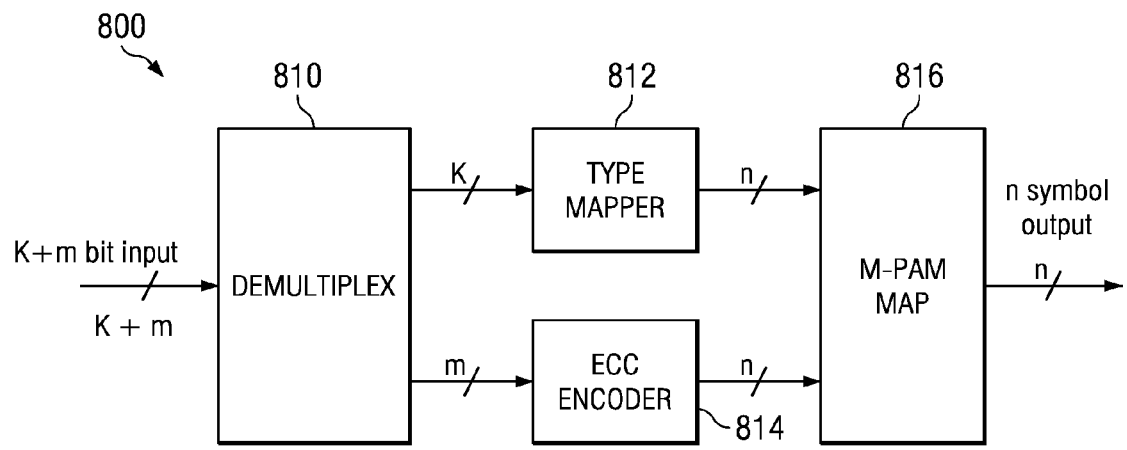
FIG. 8 is a block diagram of a modulator that employs an ECC encoder to mapping bits onto a block of M-PAM signals in accordance with an embodiment.

FIG. 8 is a block diagram of a modulator 800 that employs an ECC encoder 814 to mapping bits onto a block of M-PAM signals in accordance with an embodiment. Modulator 800 receives K+m bits supplied to a demultiplex module 810. Type mapper 812 is combined with a trellis encoder 814, and the elements of the cosets are selected by the type mapper output. In this case the "uncoded" bits are encoded by type mapper 812 as shown in FIG. 8, which shows an encoder operating at rate (k+m)/n bits per symbol.

In the description of type mapped PAM above, the M-PAM constellation is partitioned into two sets, each of size M/2. The two sets are: the positive points $\{+1, +3, \ldots, +(M-1)\}$ (these also represent the magnitudes), and the negative points $\{-1, -3, \ldots, -(M-1)\}$ A binary ECC, such as a Binary Convolutional Code (BCC), may be used to select the set (i.e., the sign) for each symbol, resulting in a trellis coding structure such as depicted in FIG. 8. However, this partition would not be as useful as the Ungerboeck 2-way partition:

$$MPAM_0 = \{+1, -3, +5, -7, \ldots\} = \{i | i = 4 \cdot j + 1\}$$

$$MPAM_1 = \{-1, +3, -5, +7, \ldots\} = \{i | i = 4 \cdot j - 1\}$$

With this partition, a BCC with good Hamming distance, combined with the type mapper, will produce a signal with the advantages of the type mapped encoder (e.g., shaping, rate resolution, nonpower-of-2 constellations), and the robust error correction capabilities of the BCC.

In the 2-way partitioned M-PAM example, each coset has equal size and the magnitudes of each coset can be put into a 1-1 correspondence. This can translate into an optimum scheme for maximizing the shaping while providing robust error control, illustrating how type mapping and trellis encoding can be perfectly complementary.

WiMedia based UWB systems use a BCC in conjunction with Orthogonal Frequency Division Multiplexing (OFDM) to provide reliable communication. The transmitted signal is defined such that there are 128 frequency bins in the FFT. Of those, 100 tones are used to carry information, 12 for pilot information, 10 as guard tones, and 6 as null tones carrying no information. Post FFT, the OFDM symbol is padded with 37 zero samples prior to transmission. The OFDM symbol duration is 312.5 ns, meaning that the bandwidth occupied by a single OFDM symbol is 528 MHz. WiMedia based UWB systems operate at various different carrier frequencies. They additionally can 'hop' across multiple carrier frequencies during the course of packet transmission according to a Time-Frequency Code (TFC). The underlying BCC is a rate 1/3 mother code is punctured to varying degrees, and interleaved across 6 OFDM symbols, to produce data rates from 53.3 Mbps to 480 Mbps.

Figure 9:
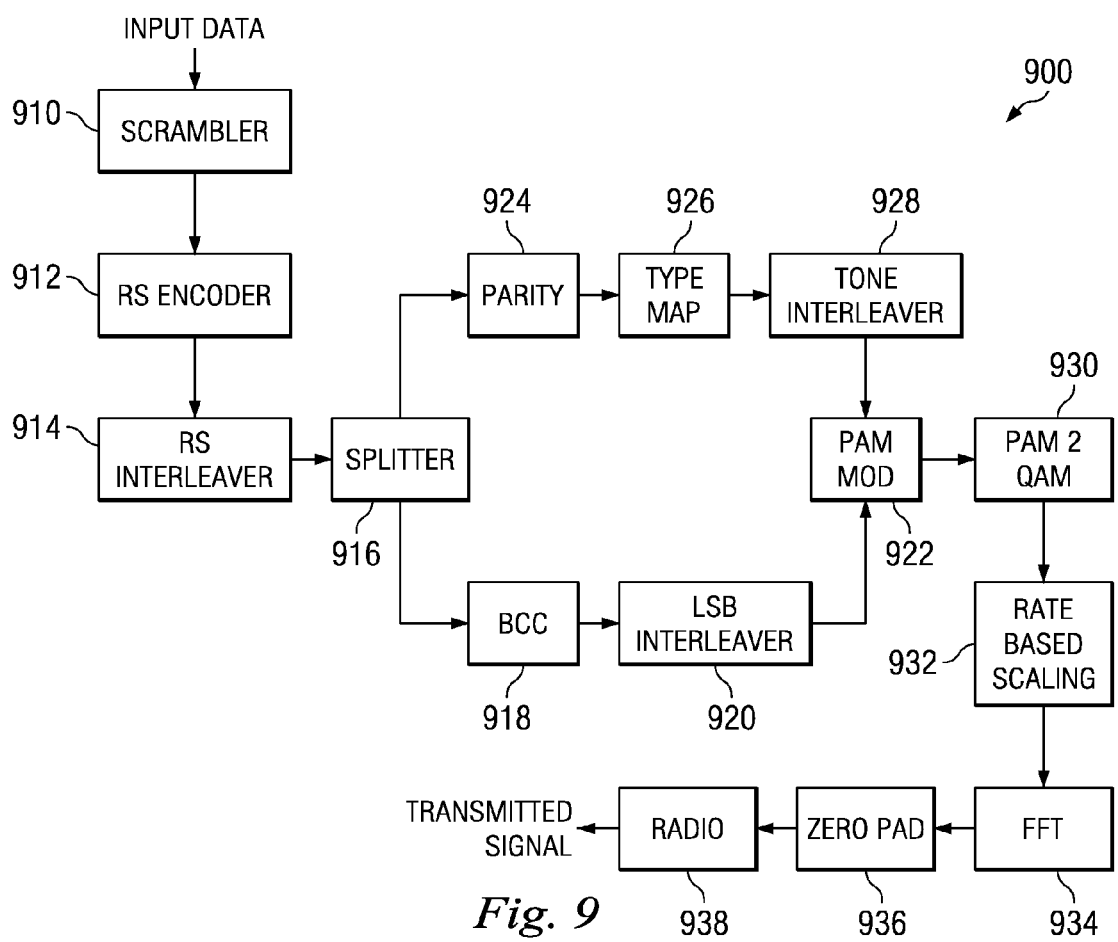
FIG. 9 is a diagrammatic representation of a baseline WiMedia UWB system implemented in accordance with an embodiment.

FIG. 9 is a diagrammatic representation of a baseline WiMedia UWB system 900 implemented in accordance with an embodiment. In one embodiment, the type mapper may be used within the structure of the WiMedia based UWB system 900.

In the illustrative example, data is passed through a scrambler 910 that is used to 'whiten' the binary information so that 0's and 1's have equal probability and the input to the FEC looks random. Next, the data is encoded using an Reed-Solomon Outer code (RS Encoder) 912 and then interleaved according to the structure defined in RS Interleaver 914. The output of interleaver 914 is then processed by a splitter 916, which sends some data to BCC 918 (the "coded" data) and the rest to a parity generation block 924 and then to a type mapper 926 (the "shaped" data). The parity generation block 924 adds a single parity bit to each group of (k−1) bits from the shaped data resulting in a k-bit input to the type mapper 926 producing an n symbol output. The output of the type mapper 926 is passed to a tone interleaver 928 which arranges the symbols across OFDM symbols. The coded data is encoded by the BCC 918 and then interleaved according to the pattern defined by a LSB interleaver 920. The output of both interleavers 920, 928 is processed by a PAM modulation block 922, resulting in a stream of PAM symbols. Pairs of PAM symbols are mapped to QAM constellation points 930. The QAM constellation points are scaled according to a rate-based scaling function 932 resulting in constellation points with the correct average power. The constellation points are processed by an FFT 934, padded by zero pad module 936, and then passed to radio 938 which transmits the data across one or more carrier frequencies according to an optimized TFC.

There are many parameters and system design issues that are jointly considered to construct a high performance, computationally efficient and robust communications system, such as: OFDM data tone selection, type mapper parameters, PAM modulation, rate based scaling, RS Encoder parameters, RS Interleaver Design, Splitter, parity addition, tone interleaver, optimized TFC, and LSB interleaver.

OFDM data tone selection may be considered as a parameter to increase the data throughput of the system in accordance with an embodiment. In an implementation, the "guard tones" in a WiMedia based system may be utilized as additional data tones. In this manner, the total number of data tones may be increased to 110 from 100.

Type Mapper Parameters may be considered as a system design parameter in accordance with an embodiment. In this implementation, the alphabet of the type mapper contains 3 elements, A={1,3,5}. These are the "magnitudes" of a 6-PAM constellation. The block length is chosen as n=16. This results in 153 distinct types and $3^{16}$(~43 million) unique messages for each block. The types are ordered by average power, to provide the maximum shaping gain.

PAM Modulation may be considered as a system design parameter in accordance with an embodiment. The PAM modulation used is closely associated with the type Mapper parameters. In this embodiment, the type mapper output are the magnitudes of the of a 6-PAM constellation. The BCC encoder output is used to modulate the "sign" of these magnitudes according to the Ungerboeck 2-way set partition previously described.

Rate Based Scaling may be considered as a system design parameter in accordance with an embodiment. The type mapper is optimized to use minimum average power, and therefore advantageously uses the innermost constellation points more frequently than the outer ones. Thus, a rate based scaling block may be required to ensure that the average power out of the transmitter is at the desired level. For each rate of the type mapper, k, there is a respective corresponding scale factor that ensures that the average power is the same as if all the constellation points were used with the same frequency.

RS Encoder Parameters may be considered as a system design parameter in accordance with an embodiment. An extended Reed-Solomon Outer code is a powerful method to provide additional system robustness. A flexible design may provide for the system to choose either an 8 (256,240), or 12 (256,232), or 16 (256,224) error correcting code over GF(256) thereby allowing for a trade-off between error correcting capability and system throughput.

The RS Interleaver Design may be considered as a system design parameter in accordance with an embodiment. A block-interleaver is used to attempt to evenly distribute errors within an interleaver depth across all codewords thereby minimizing the probability of error. To assist the system latency fit within the framework of the WiMedia-based UWB system, the interleaver depth may, for example, be set to 2 codewords.

The Splitter may be considered as a system design parameter in accordance with an embodiment. The purpose of the splitter algorithm is to distribute data to both the type mapper and BCC encoder in a manner such that after encoding, the amount of data between both parallel paths corresponds to the same number of modulated constellation points. This balancing of data between the two paths is important as it minimizes the amount of pad data that is used and helps maximize system throughput. In accordance with an embodiment, one or more of several constraints may be considered by the splitting algorithm. In an implementation, the splitter divides data among the two paths "on the fly" without the need for memory. Because there is a great deal of rate flexibility in the type mapper and many puncturing possibilities for the BCC, the splitter is able to support arbitrary ratios of data between the two data paths. The converse combining algorithm (i.e., the inverse of the splitter that reconstructs a single data stream from the two data paths) has heavy interaction with the Reed Solomon De-interleaver and decoder which it immediately precedes in the receiver data path. The splitter and combiner operate in a manner that does not disrupt the properties of the RS De-interleaver.

Figure 10:
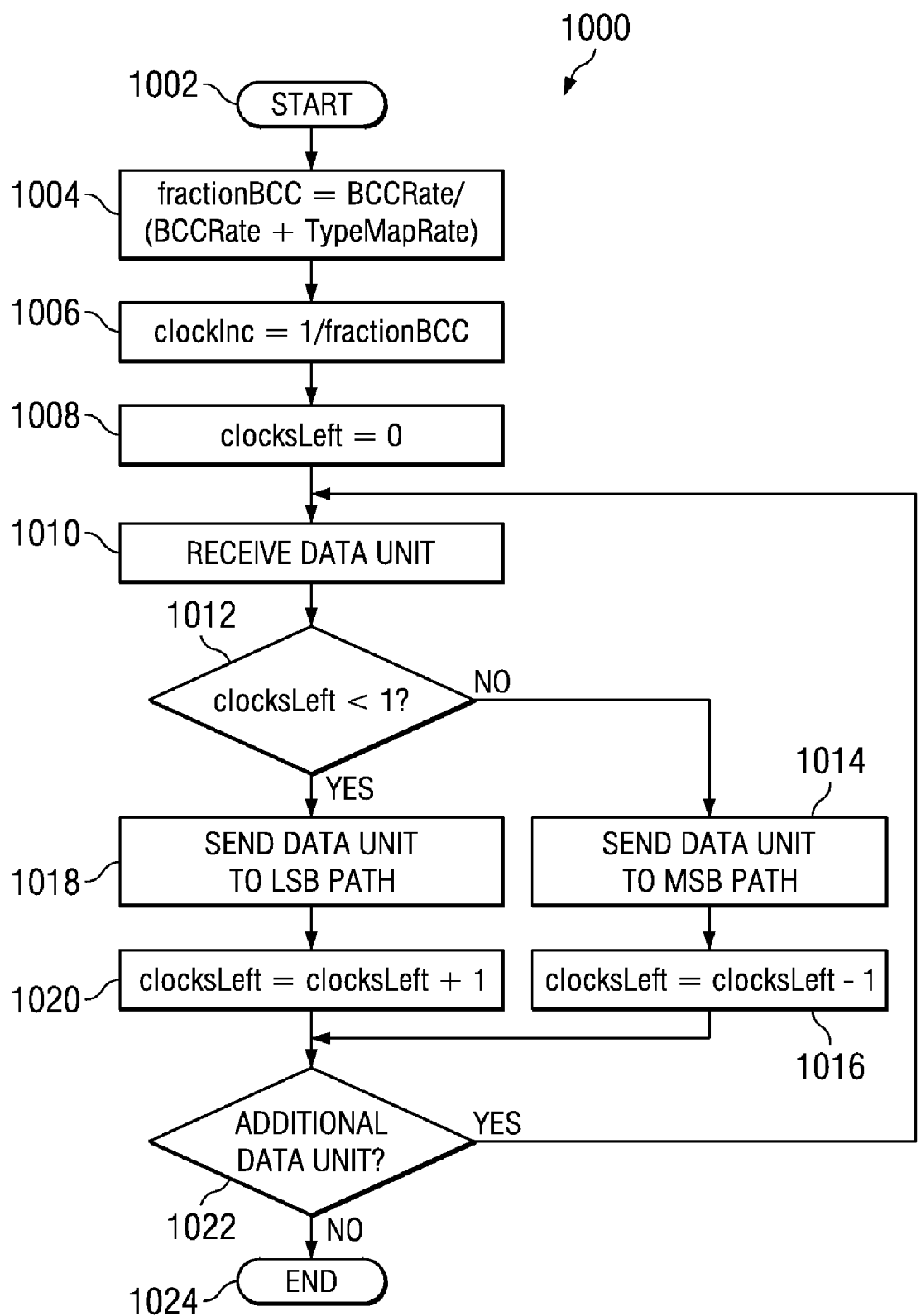
FIG. 10 is a flowchart depicting processing of a splitting algorithm implemented in accordance with an embodiment.

As referred to herein, the BCCRate comprises the rate of the BCC after puncturing, and typeMapRate comprises the number of message bits divided by the type Mapper block length. FIG. 10 is a flowchart 1000 depicting processing of a splitting algorithm implemented in accordance with an embodiment. The splitting algorithm is invoked (step 1002), and a fractionBCC variable may be set to the quotient of the BCCRate and the sum of the BCCRate and the type map rate (typeMapRate) (step 1004). A clockInc variable may then be set to the multiplicative inverse of the fractionBCC value (step 1006). A clocksLeft variable may then be initialized to zero (step 1008). A data unit may then be received by the splitting algorithm (step 1010), and an evaluation may be made to determine if the clocksLeft value is less than one (step 1012). In the event the clocksLeft value is not less than one, the data unit may be sent to the MSB path (step 1014), and the clocksLeft value may be decremented (step 1016). An evaluation may then be made to determine if another data unit is available for processing (step 1022).

Returning again to step 1012, in the event that the clocksLeft value is less than one, the data unit may be sent on the alternative data path, e.g., the LSB path in the present example (step 1018). The clocksLeft value may then be incremented (step 1020), and an evaluation may then be made to determine if another data unit is available for processing according to step 1022. In the even that another data unit remains for processing, the splitting algorithm may receive the data unit according to step 1010. Alternatively, the splitting algorithm cycle may then end if no data unit remains for processing (step 1024).

The described implementation addresses all of the constraints and may handle an arbitrary ratio of data between the BCC and typeMap data paths. As each data unit is streamed to the splitter, a decision is made as to which path the data unit is sent. Buffering may not be required since the operation is performed on a "per data unit" basis. The bit-width of the data unit is arbitrary. If can be a bit, nibble, byte, or any other bit-width. To address the third constraint and optimize the system performance, the width of the data unit may be tied or otherwise associated with the depth of the Reed-Solomon interleaver. For example, if the RS interleaver had a depth of W codewords and operates on bytes (i.e., GF(256)), then the splitter is chosen to operate on a data unit of W bytes. In this embodiment of the splitter, W=2. This structure ensures that that bursts of W-byte errors on either the BCC or typeMap paths are broken up and de-interleaved into W separate RS codewords prior to decoding. This improves the RS decoder performance and ensures that the RS de-interleaver breaks up bursts of W byte errors and is preserved for all splitting ratios.

A parity bit can additionally be added to each type mapped block of data. A single bit is added to each block to ensure that the parity of the entire block is either even or odd. This reduces the throughput of the system slightly, but allows the receiver to identify blocks that have an odd number of bits in error. In this manner, the receiver is able to use the erasure decoding ability of the RS decoder and, in the best case, double the number of errors the decoder can correct.

The PAM magnitudes may be combined with the output of the LSB decoder the same order as they were output from the type mapper. The resulting PAM symbols are then mapped to QAM constellation points and then modulated using OFDM. In this manner, the PAM magnitudes are mapped, in pairs, across the frequency sub-carriers. That is, each block of n PAM magnitudes is spread across n/2 sub-carriers. In a purely Gaussian channel, no single sub-carrier dominates performance since each exhibits the same SNR and therefore the same symbol-error probability. However, in wireless communication systems, frequency selective fading is a common phenomenon. In such channels, the SNR across sub-carriers can differ significantly. For example, suppose there is a sub-carrier that has very poor SNR and results in a decoding error. In the above mapping, this sub-carrier will result in a decoding error in every OFDM symbol. In an embodiment, this problem is resolved by adding an interleaver after the type mapper whose output will be combined with the LSB interleaver to produce PAM symbols. The pattern of the interleaver is selected so that a single set of PAM magnitudes from the type mapper is affected by a single sub-carrier. Care is taken in WiMedia hopping modes, in which the signal is spread across 3 channels according to a particular TFC. In hopping modes, the interleaver ensures that each set of PAM magnitudes is affected by a single subcarrier on a single channel. For example, in the 3 band hopping TFCs (where the signal is spread across 3 channels) and with a typeMap block length of n=16, an interleaver depth of 24 OFDM symbols ensures that each block is affected by only 1 sub-carrier of 1 of the 3 channels. While this is possible, it can add a large buffering need to the encoding and decoding paths, which increases implementation cost and power consumption. It also increases latency. These effects are undesirable.

In accordance with an embodiment, the interleaver depth is reduced to 8 OFDM symbols when the "optimized TFC" described below is used. This interleaver in conjunction with the optimized TFC preserves the property that each typeMapped block is affected by a single subcarrier from a single channel.

In application to Ultra Wideband (UWB) systems, frequency hopping modes allow a transmitter to transmit more power without violating the power limits of the world's regulatory domains. However, as previously mentioned, the exiting hopping patterns of the WiMedia specification, when used in conjunction with the desired tone interleaver, result in a large interleaver depth which increases encoding/decoding latency and power consumption. Therefore, a new hopping pattern is implemented in accordance with an embodiment.

The hopping pattern of the present embodiment is applied to the payload portion of the packet. The PHY Preamble and Header portions of the packet are still sent with one of the standard WiMedia hopping patterns. This enables backward compatibility with WiMedia devices which do not support the TFC hopping pattern of the present embodiment. The TFC hopping pattern is defined by the following sequence:

1. n/2 OFDM symbols sent on channel 0 followed by
2. n/2 OFDM symbols sent on channel 1 followed by
3. n/2 OFDM symbols sent on channel 2
4. repeat from step 1 until end of payload.

This hopping pattern keeps the interleaving block of PAM magnitudes on one of the three sub bands. In an embodiment as applied to the WiMedia wireless communication specification, the value of n in the above definition is 16. Therefore, the hopping pattern is 24 OFDM symbols long in this case which allows for a tone interleaver depth of 8 OFDM symbols. The BCC bit interleaving pattern of the present embodiment uses only the last two stages of the WiMedia interleaving pattern and not the first. The first stage is symbol interleaving, which permutes bits across 6 consecutive OFDM symbols to take advantage of frequency diversity across the band. The second stage is an intra OFDM-symbol tone interleaver which provides robustness against narrow-band interferers. The third is an intra OFDM-symbol cyclic shifter which allows for better use of frequency diversity. Using the last 2 stages only significantly reduced the decoding latency of the embodiment without impacting performance.

The flowchart of FIG. 10 depicts process serialization to facilitate an understanding of disclosed embodiments and is not necessarily indicative of the serialization of the operations being performed. In various embodiments, the processing steps described in FIG. 10 may be performed in varying order, and one or more depicted steps may be performed in parallel with other steps. Additionally, execution of some processing steps of FIG. 10 may be excluded without departing from embodiments disclosed herein. The illustrative block diagrams and flowchart depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method of wireless communication, the method comprising:
   determining a type from a plurality of types, wherein the plurality of types are ordered and each is uniquely associated with counts of symbols of an alphabet and wherein the determined type is based on the order of the types and an integer;
   determining an element of the determined type from one or more elements of the determined type, wherein the elements of the determined type are ordered and each is uniquely associated with a vector having the counts of symbols of the alphabet associated with the determined type and wherein the element is determined based on the order of the elements and the integer; and
   transmitting a communications signal representing the determined element.

2. The method of claim 1, wherein the plurality of types are ordered based on a shaping gain to minimize an average energy.

3. The method of claim 1, wherein determining the element comprises determining the element based on the order of the elements and a residue integer based on the integer and the determined type.

4. The method of claim 1, wherein the alphabet comprises a number of symbols (M), wherein M is not equal to $2^N$, wherein N is any integer.

5. The method of claim 1, wherein the integer comprises a plurality of bits for encoding.

6. The method of claim 1, wherein the determined element comprises a plurality of the symbols, and wherein transmitting the signal comprises transmitting the plurality of symbols.

7. A computer-readable medium having computer-executable instructions for execution by a processing system, the computer-executable instructions for wireless communication, comprising:
   instructions for determining a type from a plurality of types, wherein the plurality of types are ordered and each is uniquely associated with counts of symbols of an alphabet and wherein the determined type is based on the order of the types and an integer;
   instructions for determining an element of the determined type from one or more elements of the determined type, wherein the elements of the determined type are ordered and each is uniquely associated with a vector having the counts of symbols of the alphabet associated with the determined type and wherein the element is determined based on the order of the elements and the integer; and
   instructions for transmitting a communications signal representing the determined element.

8. An apparatus for wireless communication, the apparatus comprising:
   means for determining a type from a plurality of types, wherein the plurality of types are ordered and each is uniquely associated with counts of symbols of an alphabet and wherein the determined type is based on the order of the types and an integer;
   means for determining an element of the determined type from one or more elements of the determined type, wherein the elements of the determined type are ordered and each is uniquely associated with a vector having the counts of symbols of the alphabet associated with the determined type and wherein the element is determined based on the order of the elements and the integer; and
   means for transmitting a signal representing the determined element.

9. An apparatus for wireless communication, the apparatus comprising:
   a processing system configured to:
      determine a type from a plurality of types, wherein the plurality of types are ordered and each is uniquely associated with counts of symbols of an alphabet and wherein the determined type is based on the order of the types and an integer; and
      determine an element of the determined type from one or more elements of the determined type, wherein the elements of the determined type are ordered and each is uniquely associated with a vector having the counts of symbols of the alphabet associated with the determined type and wherein the element is determined based on the order of the elements and the integer; and
   a transmitter configured to transmit a communication signal representing the determined element.

10. The device of claim 9, wherein the plurality of types are ordered to minimize an average energy.

11. The device of claim 9, wherein the processing system determines the element based on the order of the elements and a residue integer based on the integer and the determined type.

12. The device of claim 9, wherein the alphabet comprises a number of symbols (M), wherein M is not equal to $2^N$, wherein N is any integer.

13. A media player comprising:
    at least one antenna;
    a processing system configured to:
       determine a type from a plurality of types, wherein the plurality of types are ordered and each is uniquely associated with counts of symbols of an alphabet and wherein the determined type is based on the order of the types and an integer; and
       determine an element of the determined type from one or more elements of the determined type, wherein the elements of the determined type are ordered and each is uniquely associated with a vector having the counts of symbols of the alphabet associated with the determined type and wherein the element is determined based on the order of the elements and the integer; and
    a transmitter configured to transmit, via the at least one antenna, a communication signal representing the determined element.

14. A method of wireless communication, the method comprising:
    receiving a communications signal representing a vector;
    determining a type from a plurality of types based on the communications signal, wherein the plurality of types are ordered and each is uniquely associated with counts of symbols of an alphabet and wherein the determined type is based on the vector; and
    determining an integer based on the vector and the determined type.

15. The method of claim 14, wherein the plurality of types are ordered based on a shaping gain to minimize an average energy.

16. The method of claim 14, wherein determining the integer comprises determining the integer based on an order of elements associated the determined type.

17. The method of claim 14, wherein the alphabet comprises a number of symbols (M), wherein M is not equal to $2^N$, wherein N is any integer.

18. A computer-readable medium having computer-executable instructions for execution by a processing system, the computer-executable instructions for wireless communication, comprising:

instructions for receiving a communications signal representing a vector;

instructions for determining a type from a plurality of types based on the communications signal, wherein the plurality of types are ordered and each is uniquely associated with counts of symbols of an alphabet and wherein the determined type is based on the vector; and instructions for determining an integer based on the vector and the determined type.

19. An apparatus for wireless communication, the apparatus comprising:

means for receiving a communications signal representing a vector;

means for determining a type from a plurality of types, wherein the plurality of types are ordered and each is uniquely associated with counts of symbols of an alphabet and wherein the determined type is based on the vector; and means for determining an integer based on the vector and the determined type.

20. An apparatus fix wireless communication, the apparatus comprising:

a receiver configured to receive a communication signal representing a vector;
and
a processing system configured to:
determine a type from a plurality of types, wherein the plurality of types are ordered and each is uniquely associated with counts of symbols of an alphabet and wherein the determined type is based on the vector; and
determine an integer based on the vector and the determined type.

21. The apparatus of claim 20, wherein the plurality of types are ordered to minimize an average energy.

22. The apparatus of claim 20, wherein the processor determines the integer based on an order of elements associated the determined type.

23. The apparatus of claim 20, wherein the alphabet comprises a number of symbols (M), wherein M is not equal to $2^N$, wherein N is any integer.

24. A television comprising:
at least one antenna;
a receiver configured to receive a communication signal representing a vector via the at least one antenna; and
a processing system configured to:
determine a type from a plurality of types, wherein the plurality of types are ordered and each is uniquely associated with counts of symbols of an alphabet and wherein the determined type is based on the vector; and
determine an integer based on the vector and the determined type.

25. A method of wireless communication, comprising:
determining a type from a plurality of types based at least in part on a plurality of bits, wherein each type of the plurality of types comprises one or more vectors, each of the one or more vectors including one or more elements of an alphabet, wherein counts of the elements in the vectors are unique for each type;
determining a vector from the one or more vectors of the determined type based at least in part on the plurality of bits;
mapping the elements of the determined vector onto a signal constellation; and
transmitting a wireless signal based on the mapped elements.

26. The method of 25, wherein the plurality of types are ordered and wherein the vectors of each type are ordered, wherein determining the type comprises determining type based on the plurality of bits and the order of the types, and wherein determining the vector comprises:
determining the vector based on the plurality of bits and the order of vectors in the determined type.

27. The method of claim 25, wherein the plurality of bits comprise a number of bits k plus a number of bits n, wherein the k bits are used to determine the type and the vector, and wherein the mapping comprises mapping each element of the determined vector to a signal in the constellation having a sign determined by a respective one of the n bits.

28. The method of claim 25, wherein the plurality of bits comprise a number of bits k plus a number of bits m, wherein the k bits are used to determine the type and the vector, and wherein the mapping comprises mapping each element of the determined vector to a signal in a coset of the constellation, wherein the coset is determined using the m bits.

* * * * *